United States Patent
Moore

(10) Patent No.: US 8,840,090 B2
(45) Date of Patent: Sep. 23, 2014

(54) ANIMAL PROOF HOODED BARRIER, RELATED ENCLOSURE SYSTEMS AND METHOD OF MAINTAINING AN ANIMAL PROOF DOMAIN

(75) Inventor: Donald E. Moore, Morrisville, PA (US)

(73) Assignee: Vanquish Fencing, Inc., Morrisville, PA (US)

( * ) Notice: Subject to any disclaimer, the term of this patent is extended or adjusted under 35 U.S.C. 154(b) by 0 days.

(21) Appl. No.: 12/689,591

(22) Filed: Jan. 19, 2010

(65) Prior Publication Data

US 2010/0243979 A1  Sep. 30, 2010

Related U.S. Application Data

(60) Provisional application No. 61/163,579, filed on Mar. 26, 2009.

(51) Int. Cl.
 *E04H 17/00* (2006.01)
 *A01K 3/00* (2006.01)

(52) U.S. Cl.
 CPC .............. *E04H 17/003* (2013.01); *A01K 3/00* (2013.01)
 USPC .......................................................... 256/11

(58) Field of Classification Search
 USPC ............. 256/1, 11, 12; 52/101; 119/502, 516, 119/532
 See application file for complete search history.

(56) References Cited

U.S. PATENT DOCUMENTS

| | | | |
|---|---|---|---|
| 448,318 A | 3/1891 | Chattanay et al. | |
| 2,112,229 A * | 3/1938 | Davis ............................. | 52/101 |
| 5,143,354 A | 9/1992 | Nolan | |
| 5,267,724 A | 12/1993 | Heath et al. | |
| 6,113,076 A | 9/2000 | Hancock-Bogese et al. | |
| 6,199,831 B1 | 3/2001 | Patrick et al. | |
| 6,571,517 B2 | 6/2003 | Wulff et al. | |
| 7,040,605 B2 * | 5/2006 | Lappen ........................... | 256/10 |
| 7,562,453 B1 | 7/2009 | Benner et al. | |
| 2006/0207195 A1 * | 9/2006 | Donoho ......................... | 52/101 |
| 2008/0110106 A1 * | 5/2008 | Holly ............................. | 52/101 |

OTHER PUBLICATIONS

Vanquish Fencing, Vanquish V-Channel Deterrent System, Substation Installation Guide, www.vanquishfencing.com, Revised Mar. 8, 2007, 28 pages.

"Revolutionary Fence Proves to Reduce Animal Caused Power Outages in Electrical Substations", The Vanguish Solution, Morrisville, PA, Apr. 11, 2008, Site by Tobin Lehman, Available online at www.vanquishfencing.com/revolutionary-fence-proves-to-reduce-animal-caused-power-outages-in-electrical-substations, 2pages.

\* cited by examiner

*Primary Examiner* — Michael P Ferguson
*Assistant Examiner* — Daniel Wiley
(74) *Attorney, Agent, or Firm* — Flaster/Greenberg P.C.

(57) ABSTRACT

A substantially animal-proof barrier ("APB") that includes (a) two supports that are laterally spaced apart to define a substantially vertical plane there between; (b) fencing material that is attached to each of the supports and spans the defined substantially vertical plane to form a simple barrier that has a top edge, a bottom edge, a front surface and a back surface, wherein the simple barrier divides a domain into a first area and a second area; and (c) a hood having an inner surface, the hood originating from the top edge of the simple barrier is described. An angle formed by the inner surface of the hood and the front surface of the simple barrier measures about 10 degrees to about 80 degrees, such that a channel having a substantially V-shaped cross section is formed.

15 Claims, 4 Drawing Sheets

US 8,840,090 B2

ANIMAL PROOF HOODED BARRIER, RELATED ENCLOSURE SYSTEMS AND METHOD OF MAINTAINING AN ANIMAL PROOF DOMAIN

CROSS REFERENCE TO RELATED APPLICATIONS

This application claims the benefit under 35 U.S.C. §119(e) of U.S. Provisional Patent Application No. 61/163,579, filed Mar. 26, 2009, the entire disclosure of which is incorporated herein by reference.

BACKGROUND OF THE INVENTION

For centuries, humans have erected fences and other barriers to keep small animals in or outside of yards, dwellings, food storage areas and the like. Most small animals, such as rats, mice, snakes and other reptiles, however, can crawl and climb and are therefore able to easily circumvent simple fences. In recent years, the ability to exclude small animals from certain areas has taken on great significance from economic, ecological and safety perspectives. For example, certain sensitive municipal or utility sites, such as power substations or water reservoirs, are adversely affected when small animals circumvent the fencing placed around such areas and short circuit electrical equipment or otherwise contaminate the equipment, precipitating a site-wide shut down, which may result in blackouts, and/or power or water shortages for the surrounding communities and industries. Less catastrophically but no less significantly, barriers for keeping wildlife and other small animals in or out of an area are useful in residential areas, picnic areas, wildlife sanctuaries, pool areas, zoological and botanical gardens, and agricultural lands.

In addition to providing an effective barrier against small animals, any fencing or barrier must be have a structure that is capable of enduring a full range of weather effects with little or minimum maintenance, including high winds, hurricane winds, ice, large volumes of snow and exposure to UV rays.

In view of these challenges, there remains a need in the art for a fence or barrier system that is easy to assemble even in remote locations, but is effective in excluding small animals from the enclosed area and capable of withstanding extreme weather conditions with little or no maintenance.

BRIEF SUMMARY OF THE INVENTION

The invention encompasses a substantially animal-proof barrier ("APB") that includes (a) two supports that are laterally spaced apart to define a substantially vertical plane therebetween; (b) fencing material that is attached to each of the supports and spans the defined substantially vertical plane to form a simple barrier that has a top edge, a bottom edge, a front surface and a back surface, wherein the simple barrier divides a domain into a first area and a second area; and (c) a hood having an inner surface, the hood originating from the top edge of the simple barrier. An angle formed by the inner surface of the hood and the front surface of the simple barrier measures about 10 degrees to about 80 degrees, such that a channel having a substantially V-shaped cross section is formed.

Also included with the scope of the invention are enclosure systems that incorporate at least one APB and/or an enclosure system to maintain an animal population on a first side of a domain. Such enclosures include (a) at least three supports that are laterally spaced apart to define a define a substantially vertical plane; (b) fencing material that is serially attached to each of the at least three supports to span the defined substantially vertical plane to form a simple barrier that has a top edge, a bottom edge, a front surface and a back surface, wherein the simple barrier divides a domain into a first area and a second area; and (c) a hood having an inner surface, the hood originating from the top edge of the simple barrier, wherein an angle formed by the inner surface of the hood and the front surface of the simple barrier measures about 10 degrees to about 80 degrees.

Methods of maintaining an animal population in an enclosure comprising placing along a perimeter of the domain using the APB or the enclosure of the invention are also described.

BRIEF DESCRIPTION OF THE SEVERAL VIEWS OF THE DRAWING(S)

The foregoing summary, as well as the following detailed description of preferred embodiments of the invention, will be better understood when read in conjunction with the appended drawings. For the purpose of illustrating the invention, there is shown in the drawings several embodiments. It should be understood, however, that the invention is not limited to the precise arrangements and instrumentalities shown. In the drawings.

DETAILED DESCRIPTION OF THE INVENTION

Figure 1:
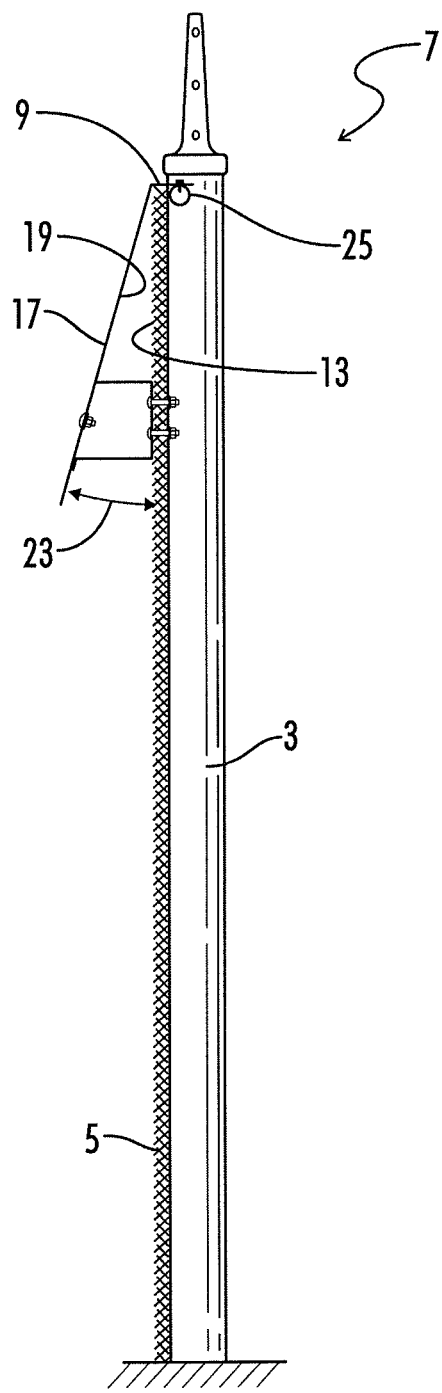
FIG. 1 is a cross section of an embodiment of the simple barrier of the invention.

The invention described herein provides a substantially animal-proof hooded barrier ("APB") that allows for the enclosure of a space of any size to exclude from or maintain within the enclosure animals, particularly small animals that are able to climb up and over conventional fencing. Also included within the invention are enclosure systems that incorporate at least one APB, and preferably are wholly comprised of APB. Such enclosure systems may include at least one access portal (such as a door, gate or gated bridge), allowing pedestrian traffic and/or vehicle traffic to pass in and out of the enclosure. Also included within the scope of the invention are methods of maintaining an animal population within an enclosure using an enclosure system that includes the APBs of the invention.

Numerous applications exist for the APBs, enclosure systems and methods of the invention. For example, the invention may be used to surround power substations, recreational parks, water reservoirs, playgrounds, terraces and patios and other areas where it is desirable to maintain a substantially small animal-free zone. Other applications include use in wildlife parks and sanctuaries, zoological and botanical gardens, golf courses, outdoor sports venues, hotels and other leisure facilities grounds, swimming pool areas, and the like.

The invention includes an animal-proof barrier ("APB"). "Animal-proof" as used herein, means that the barrier substantially prevents animals from climbing up and over it, especially small animals (for example, animals that are less than or equal to about 100 pounds in weight). For example, such animals may include, without limitation, any and all non-flying climbing mammalian and non-mammalian animals, such as, for example, rodents, squirrels, chipmunks, beavers, gophers, groundhogs, and prairie dogs, small primates, such as rhesus monkeys, lemurs, tarsiers and marmoset, and small humans, climbing cats, such as bobcats, wild cats, domestic and feral cats, non-flying birds such as chickens and turkeys, and reptiles and amphibians, such as snakes, lizards, alligators, frogs, toads, anoles, crocodiles, and newts.

In an embodiment, the APB includes two supports, although three or more supports may be preferred, depending on the grade and other topography of the terrain or floor surface, if an indoor installation. For convenience, "substrate" shall be used herein to collectively refer to the terrain, floor, concrete apron or other surface (indoor or outdoor) into or onto which the support(s) are inserted.

The supports may be spaced laterally from one another such that a vertical plane is defined between any two serially situated supports. Such spacing may be in a linear format or the spacing may be offset (e.g., along a hypothetical zig-zag or curve); spacing will necessarily vary depending on several factors, including the size and shape of the domain that the APB or enclosure is intended to circumscribe, the means by which the supports are secured or installed into/onto the substrate, and/or the topography of the substrate (e.g., incline versus flat). In an embodiment, the support(s) are spaced about 2 feet to about 20 feet from one another; about 5 feet to about 10 feet from one anther and/or about 7 feet to about 9 feet from one another. In a given enclosure, the support(s) may be spaced the same distance from one another or the distance may vary.

The support(s) may be of any dimension and such dimension may vary from support to support as necessary or desirable in a specific installation. In an embodiment, it may be desirable that the height dimension (x dimension) of the support is about 4 feet to about 20 feet, about 5 feet to about 15 feet, about 6 feet to about 8 feet.

The y and z dimensions (width and depth dimensions) may be any desirable or necessary for the particular installation in which the APB(s) or enclosures are used. For example, in an embodiment at least one of the supports may be an architectural structure (e.g., a pool cabana, shed, dwelling, or other building). In an embodiment, the support(s) may be conventional fence posts having, for example, either round, elliptical, or polygonal cross sections. In an embodiment that may be preferred, the support(s) have a round cross-section of a diameter of about 2 inches to about 6 inches.

The supports may be made of any suitable material, including, but not limited to, wood, plastic, polymer, fiberglass, metal, aluminum, steel, stainless steel and combinations thereof. They may be hollow or solid; in an embodiment they are coated with a friction reducing polymer or other substance to further deter animals from climbing.

The supports may be placed on, in or otherwise attached to the selected substrate by any means. For example, if the substrate is earth, conventional post-holes or ditches may be dug and the post inserted below the ground. Alternatively, the supports may be inserted in brackets or tracks that run through or are attached to a concrete or blacktop floor or apron. In an other embodiment, the supports may be secured to the substrate using bolts (or other fasteners), high strength epoxies, resins or other adherents, or using external stakes and cables. In an embodiment, the supports are suspended from above (from a track, ceiling or overhanging bar) in stalactite-like configuration. In an embodiment it may be preferable that the supports are placed below ground or are spaced within a cement or blacktop apron, to make it more difficult for animals to circumvent the barrier or enclosure by digging under it.

As detailed above, the two (or more) supports are spaced apart to define the substantially vertical plane between each pair of serially arranged supports. A fencing material that is attached to each of the individual supports and spans the defined vertical plane. The two supports and the fencing material so situated form a simple barrier structure. The simple barrier has a top edge, a bottom edge (that abuts the substrate or is buried within the substrate), a front surface and a back surface.

The fencing material may be any known or to be developed in the art. Suitable fencing material may include materials in any format, such as, mesh, chain link, metal sheets, polymer films, polymer sheets, screen, plates and panels. The fencing material (regardless of format) may comprise any material; suitable materials from which the fencing material may be made, in whole or in part, may include glass, wood, metal, polymer, textiles, and fiberglass. Aluminum, acrylic polymer, and vinyl polymers may be preferred. These fencing material may be treated with coating other substances that increase the material's ability to withstand weather and act to reduce friction to discourage climbing), such as UV-absorbent coatings and/or polytetrafluoroethylene over-coatings. In an embodiment, the fencing material may be about a ⅛ to about ⅜ inch mesh.

The fencing material is attached to the supports by any means known in the art. Suitable means includes use of screws, nails, epoxies, strapping, staples, brads, ties, and other fasteners. In an embodiment, the fencing material contains integral pocket-like structures along a length of fencing material that are adapted to accept insertion of the supports. In an embodiment, the fencing material is attached to the supports using stainless steel straps, such as those available from Panduit Corporation, of Tinley Park, Ill.

In an embodiment, the fence material is of a format such that it reaches the top of each of the supports and extends below the soil line (e.g., is buried in or enclosed within, the substrate). In an embodiment, it may be preferred that the fencing material is buried in the substrate about 3 to about 12 inches or about 5 inches to about 7 inches below the soil line.

In an embodiment, a top rail is located along the top edge of the simple barrier, between or above the supports. The top rail may serve a reinforcing/stabilizing function, a decorative function, and/or it may be used as a point of attachment for the hood, as described below. The top rail may be made of any material that is suitable (such as those articulated above, for use in the fabrication of the supports), although metal and/or fiberglass materials may be preferred. The top rail may be round or polygonal in cross-section and may be solid or hollow.

The APB also includes a hood. The hood originates from the top edge of the simple barrier and descends downwardly. The hood has a outer surface and an inner surface, and is attached to the simple barrier such that an angle formed by the inner surface of the hood and the front surface of the simple barrier has a measurement of about 10° to about 80°, alternatively about 20° to about 50°, alternatively about 30° to about 45°, and/or alternatively about 35° to about 40°.

The configuration of the hood and the front surface of the simple barrier results in the formation of a channel, which in cross section, substantially resembles an inverted "V". as used herein, "V-shaped channel" is intended to signify channels of a cross section that is substantially shaped like an inverted letter V, and channels having cross section that is substantially inverted U-shaped and/or may include inverted W shaped and similar variations.

The hood may include at its bottom edge, a bottom lip or other protuberance adapted to prevent an animal from climbing onto the top of the hood. The bottom lip should be located substantially close to the bottom edge of the hood. However, in some embodiments it may be located from between about 1 inch to about 10 inches above the bottom edge of the hood. In an embodiment, the bottom lip is chosen from a lip that extends substantially horizontally away from the front surface of the simple barrier, a lip that extends substantially horizontally towards the front surface of the simple barrier, and a lip that extends substantially both horizontally towards and away from the front surface of the simple barrier.

The hood may be made of any suitable material, such as, for example, those listed as suitable for use in fabrication of the supports. The hood may be attached to the simple barrier by any means known or to be developed in the art. The hood may be affixed to the top rail or to the top edge of the simple barrier. In various embodiments of the invention, the hood, top rail, and fencing material may be formed integral with one another, for example in a blow molding, thermoforming and/or stamping process. Alternatively, the hood and top rail may be formed integrally or the hood and fencing material may be formed integrally. The hood may be attached by a welding seam, epoxies, resins and other adhesives and/or screws, brackets and/or other fasteners. In another embodiment of the invention, the hood has a top edge that is adapted to be secured to the top rail or the top edge of the barrier by a screw or bracket as shown in, for example, FIG. 4.

Also included in the invention is an enclosure system to maintain an animal population on at least one side of a domain or other geographic space. The enclosure system may include at least one APB. In practice of the invention, for example, in a zoological garden or animal sanctuary, one may install the APB and related enclosures to maintain a first species (e.g., rattlesnakes) on one side of the barrier/enclosure and a second species (e.g., anoles) on the other side of the barrier. In some embodiments, it may be desirable that the APB includes two hoods—a first hood having its inner surface form an angle with the front side of the barrier and a second hood having its inner surface form an angle with the back side of the barrier.

Alternatively, the invention encompasses an enclosure system that includes at least three supports that are laterally spaced apart to define a series of substantially vertical planes that span the interval between each support. The supports may be any of those described above and arranged as described above. The perimeter of the area of domain that one wishes to enclose will dictate the location and the spacing of each support.

Any of the enclosure systems of the invention may include additional features, such as access portals, reinforcing structures, and additional security features (e.g., portions of electrified fencing). In an embodiment, the enclosure contains an access portal that permits pedestrian and/or vehicle traffic to pass in or out of the enclosure. The access portal may be in the form of a trap door-like structure inserted into the fencing, a conventional gate or door, a roller gate, a swing gate, and/or a drawbridge-like structure. In an embodiment, the gate or door is also fitted with a hood as described above.

FIG. 1 shows a cross section of an embodiment of the simple barrier (7) of the invention. In FIG. 1, a single support (3) can be seen to which mesh fencing material (5) is attached. The simple barrier (7) includes a top rail (25) and a hood (17) which is attached to the top rail (25) and which descends from the top edge (9) of the simple barrier (7). The angle (23) created between the inner surface (19) of the hood and the front surface (13) of the simple barrier (7) is approximately 45°. In many embodiments, the preferred angle may be about 25°.

Figure 2:
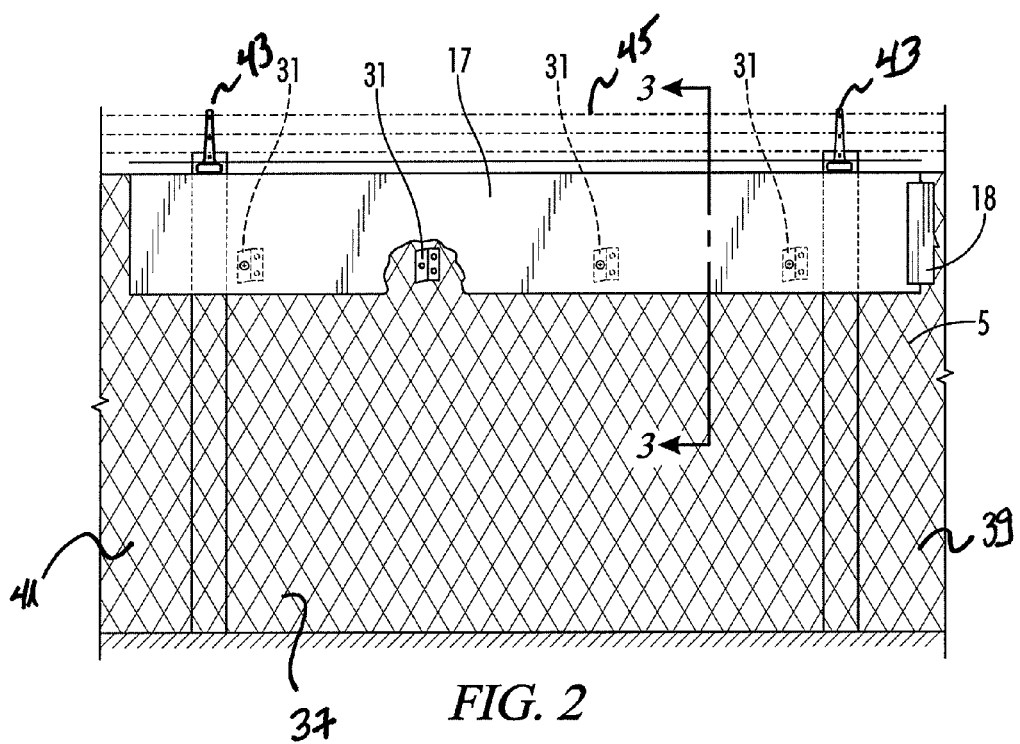
FIG. 2 is a perspective view of a portion of an enclosure of the invention wherein a portion of the hood is cut out.
Figure 3:
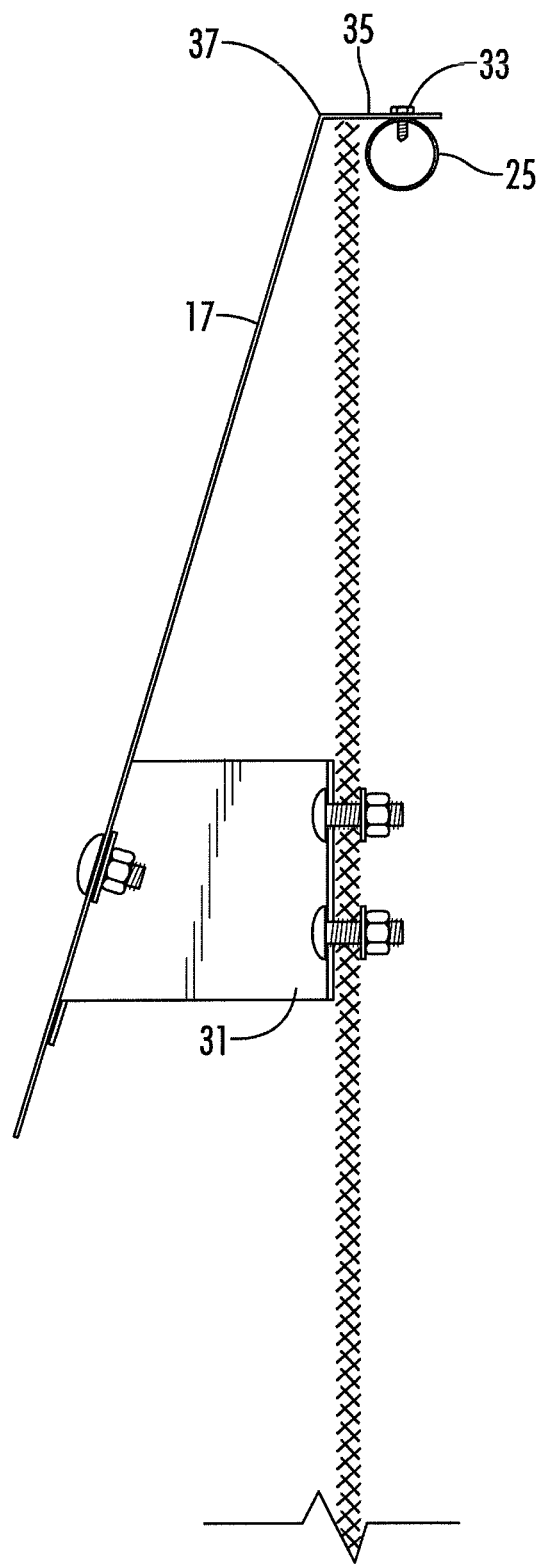
FIG. 3 is a cross section of a portion of the simple barrier of the invention taken along section line 3-3 of FIG. 2.

FIG. 3 shows a cross section of a portion of the simple barrier of the invention (section 3-3 taken from FIG. 2). The hood (17) is adapted to be attached to the top rail (25) through use of a self-drilling screw (33) by a tab (35) that extends from the top edge (37) of the hood (17). The simple barrier (7) includes a top rail (25) and a hood (17) that is attached to the top rail (25) and which descends from the top edge (9) of the simple barrier (7). In the embodiment shown in FIG. 3, the hood (17) is secured to the simple barrier (7) by a bracket (31).

FIG. 2 shows a perspective view of an enclosure, showing one APB (37) and portions of a second (39) and a third (41) APB. The hood (17) is, at one location shown cut away to illustrate the brackets (31) which aid in the attachment of the hood to the simple barrier. In this embodiment, the supports include finial-type structure (43), between which several rows of barbed wire (45) are strung for added security.

Figure 4:
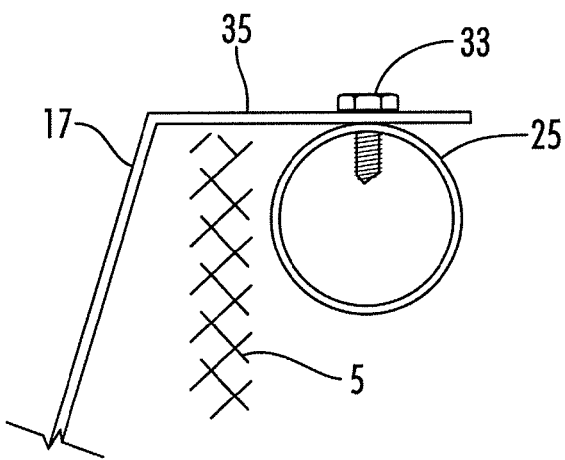
FIG. 4 shows a detail wherein the hood is connected to a top rail.
Figure 5:
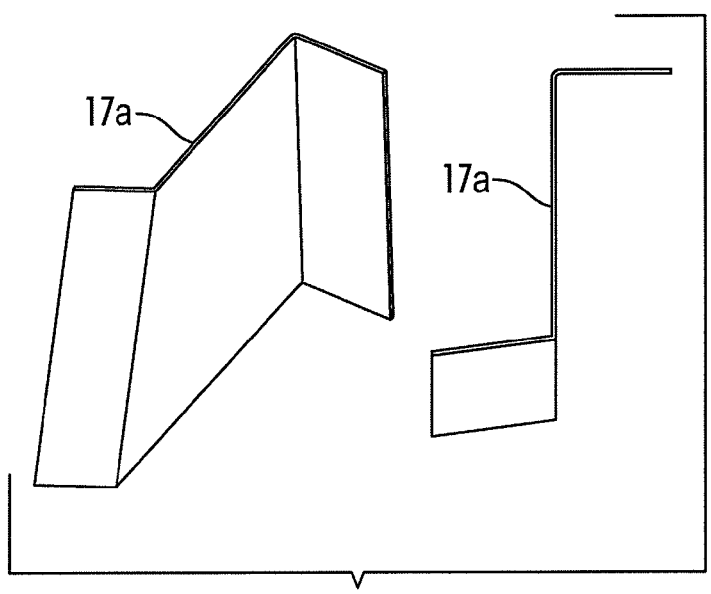
FIG. 5 shows an example of a hood lip configuration.
Figure 6:
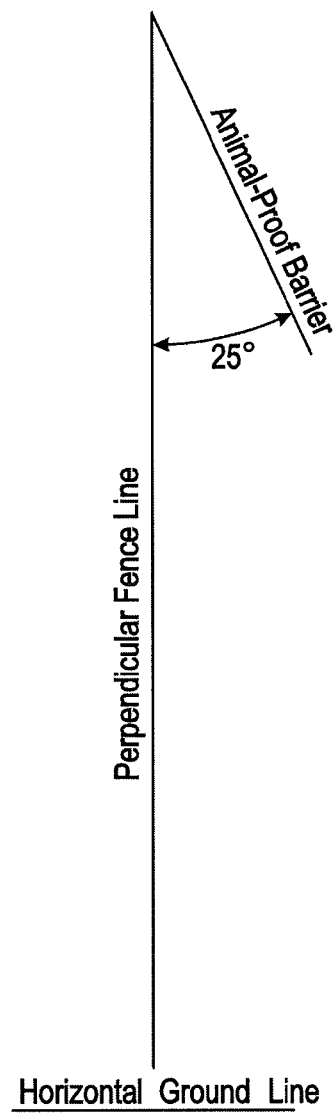
FIG. 6 is a schematic cross sectional view showing an embodiment wherein an angle formed by the hood's inner surface and the front surface of the barrier is about 25 degrees.

FIG. 4 shows a detail from the top of the APB, illustrating the attachment of the hood (17) to the top rail (25) via a screw/fastener (33).

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. A substantially animal-proof barrier comprising:
   two supports that are laterally spaced apart to define a substantially vertical plane therebetween;
   fencing material that is attached to each of the supports and spans the defined substantially vertical plane to form a simple barrier that has a top edge, a bottom edge, a front surface and a back surface, wherein the simple barrier divides a domain into a first area and a second area, and wherein a top rail is attached to the back surface of the simple barrier along the top edge;
   a hood having planar inner and outer surfaces and including a top portion extending over the top edge and attached to the top rail, and a bottom portion opposite the too portion, wherein an angle formed by the inner surface of the hood and the front surface of the simple barrier measures about 10 degrees to about 80 degrees, such that a channel having a substantially V-shaped cross section is formed; and
   a rigid bracket connecting the hood to the simple barrier, wherein a first end of the bracket connects to the inner surface of the hood between the top and bottom portions, and a second end of the bracket connects to the front surface of the simple barrier.

2. The substantially animal-proof barrier according to claim 1, wherein the hood comprises a bottom lip.

3. The substantially animal-proof barrier according to claim 2, wherein the bottom lip is selected from a lip that extends substantially horizontally away from the front surface of the simple barrier, a lip that extends substantially horizontally towards the front surface of the simple barrier, and a lip that extends substantially horizontally both toward and away from the front surface of the simple barrier.

4. The substantially animal-proof barrier according to claim 1, wherein the supports are independently made of a material chosen from wood, plastic, polymer, fiberglass, metal, aluminum, steel, stainless steel, and combinations thereof.

5. The substantially animal-proof barrier according to claim 1, wherein the fencing material is chosen from mesh, chain link, sheets and panels.

6. The barrier of claim 1 wherein at least a portion of the hood extends downwardly from the bracket.

7. An enclosure system to maintain an animal population on a first side of a domain comprising:
- at least three supports that are laterally spaced apart to define a define a substantially vertical plane;
- fencing material that is serially attached to each of the at least three supports to span the defined substantially vertical plane to form a simple barrier that has a top edge, a bottom edge, a front surface and a back surface, wherein the simple barrier divides a domain into a first area and a second area, and wherein a top rail is attached to the back surface of the simple barrier along the top edge; and
- a hood having planar inner and outer surfaces and including a top portion extending over the top edge and attached to the top rail, and a bottom portion opposite the top portion, wherein an angle formed by the inner surface of the hood and the front surface of the simple barrier measures about 10 degrees to about 80 degrees; and
- a rigid bracket connecting the hood to the simple barrier, wherein a first end of the bracket connects to the inner surface of the hood between the top and bottom portions, and a second end of the bracket connects to the front surface of the simple barrier.

8. The enclosure system according to claim 7 further comprising at least one access portal.

9. The enclosure system according to claim 8, wherein the access portal is chosen from a gate, a door, a drawbridge, a sliding door, a sliding gate, a revolving door or gate, and a trapdoor.

10. The enclosure system according to claim 7 wherein the defined vertical plane has a Y-dimension of about 7 feet to about 9 feet.

11. The enclosure system according to claim 7, wherein the supports are independently made of a material chosen from wood, plastic, polymer, fiberglass, metal, aluminum, steel, stainless steel, and combinations thereof.

12. The enclosure system according to claim 7, wherein the fencing material is chosen from mesh, chain link, sheets and panels.

13. The enclosure system of claim 7 wherein at least a portion of the hood extends downwardly from the bracket.

14. A method of maintaining an animal population in an enclosure comprising placing along a perimeter of the domain at least one substantially animal-proof barrier comprising:
- two supports that are laterally spaced apart to define a substantially vertical plane therebetween;
- fencing material that is attached to each of the supports and spans the defined substantially vertical plane to form a simple barrier that has a top edge, a bottom edge, a front surface and a back surface, wherein the simple barrier divides a domain into a first area and a second area, and wherein a top rail is attached to the back surface of the simple barrier along the top edge; and
- a hood having planar inner and outer surfaces and including a top portion extending over the top edge and attached to the top rail, and a bottom portion opposite the top portion, wherein an angle formed by the inner surface of the hood and the front surface of the simple barrier, measures about 10 degrees to about 80 degrees, such that a channel having a substantially V-shaped cross section is formed; and
- a rigid bracket connecting the hood to the simple barrier, wherein a first end of the bracket connects to the inner surface of the hood between the top and bottom portions, and a second end of the bracket connects to the front surface of the simple barrier.

15. The method of claim 14 wherein at least a portion of the hood extends downwardly from the bracket.

* * * * *